UNITED STATES PATENT OFFICE.

ROBERT GANS, OF GRUNEWALD-BERLIN, GERMANY.

METHOD OF MANUFACTURING BASE-EXCHANGING SUBSTANCES.

1,140,262.  Specification of Letters Patent.  Patented May 18, 1915.

No Drawing.  Application filed October 27, 1913. Serial No. 797,684.

*To all whom it may concern:*

Be it known that I, ROBERT GANS, chemist, a subject of the King of Prussia, German Emperor, residing at Königsallee 9, Grunewald-Berlin, Kingdom of Prussia, German Empire, have invented a new and useful Method of Manufacturing Base-Exchanging Substances; and I do hereby declare the following to be a full, clear, and exact description of the same.

It is known that melts can be prepared from aluminiferous substances, and kaolin or quartz with sodium carbonate or hydroxid, or alkali-metal silicates, said melts yielding, when treated with water, porous granular masses which on being brought into contact with solutions of various saline substances are capable of exchanging bases with same; and which may be used for softening water by a simple operation similar to filtration.

In the production of these base-exchanging masses the granules obtained vary in hardness and quality according to the duration and other conditions of the lixiviation or treatment with water. Hardness, mechanical strength and resistance to change are of course necessary in material which is to be used on the principle of base-exchange for softening water and like purposes since such material is customarily employed in layers or beds and is expected to retain its perviousness and chemical qualities for long periods of time. Longer treatment furnishes lumps that are less resistant and hard than when the action of the water is confined to a shorter period. Hard, mechanically strong granules are desirable for use in the arts. On the other hand it is necessary in practice to carry on the lixiviation until the lumps of material have become completely changed throughout and have obtained the necessary base-exchanging condition.

In the investigation of the phenomenon it has been found that the nature of the alkaline solutions obtained by, and present during, the lixiviation treatment influence the hardness and resisting properties of the resultant product, especially if employed in a heated condition. Silica passes into solution in lixiviation, thus impairing the cohesion of the masses. The present method of producing base-exchanging substances rests on this discovery and consists in preventing the dissolving of silica during lixiviation, or in enriching the masses with silica during such lixiviation. With this object, silica, in a form capable of entering into combination with alkali, may be added to the water used for lixiviating the melts. The so-called active, amorphous silica, and also the soluble or colloidal silica, are suitable for this purpose; and generally speaking, any substance containing silica capable of combination may be used. For instance an alkali metal silicate, as rich as possible in silica and employed in the form of an aqueous solution, is applicable, the ordinary water glass of commerce containing 3 to 5 molecules of silica to 1 molecule of $Na_2O$, being specially adapted for the purpose in view. Ordinary water glass although alkaline in reaction is, chemically considered, of acid nature since it contains a high ratio of silica to alkali. The additions may be mixed with the lixiviating water, either beforehand or during lixiviation, and the quantity of the additions can be calculated so as to combine the whole of the alkali liberated: or again, only a portion of the alkali need be combined.

A modification of the method consists in adding, during the lixiviation of the melts with water, acids or saline substances capable of separating out or precipitating (peptonizing) the silica which has passed into solution. This class of substance includes for instance: acids (of sufficiently low concentration to prevent any excessive decomposition), acid salts of the alkali metal (for example, bisulfites or bisulfates), the potassium or sodium salts of strong acids, such as potassium chlorid or sodium chlorid, potassium sulfate, sodium sulfate.

The foregoing method of working improves not only the strength of the final material obtained but also, as is natural, in association therewith, the total yield of base-exchanging substances so obtained.

Example: By fusing together 78 parts of sodium carbonate, 9 parts of potassium carbonate, 16 parts of kaolin, and 36 parts of feldspar, a melt was obtained, having approximately the following molecular composition:

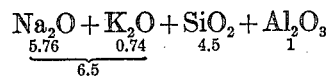

Portions, 50 grams each, of this melt were lixiviated for 5 hours at 90°–100° C., with:

(a) 375 cc. of distilled water: (b) 375 cc. of a water-glass solution, containing about 15 per cent. of silica, and prepared by suitably diluting ordinary technical water-glass solution of 30°–40° Bé. strength. The yield of base-exchanging material in this experiment corresponded to:—in the case of (a) 51%: in the case of (b) 62%. The percentage composition of the final products was as follows: in the case of (a) $SiO_2$ 40.7%, $Al_2O_3$ 23.6%, $Na_2O$ 16.6%, $H_2O$ 18.7%, in the case of (b) $SiO_2$ 47%, $Al_2O_3$ 19.4%, $Na_2O$ 15.6%, $H_2O$ 17.5%.

Equally good results can be obtained by the method with suitably modified melt charges. The relative proportions and the temperature and duration of the lixiviation are capable of modification, the preceding example being merely one selected from the extensive series of working proportions.

I claim:

1. The process of producing base-exchanging substances containing silica, alumina and other bases which consists in lixiviating a melt of the above substances with water containing substances preventing the dissolution of silica.

2. The process of producing base-exchanging substances containing silica, alumina, and other bases which consists in lixiviating a melt of the above substances with a water solution containing active silica.

3. The process of producing base-exchanging substances containing silica, alumina, and other bases which consists in lixiviating a melt of the above substances with an aqueous solution of water glass.

4. The process of producing base-exchanging substances containing silica, alumina and other bases which consists in lixiviating a melt of the above substances with a solution containing substances capable of precipitating silica from solutions.

5. The process of producing base-exchanging substances containing silica, alumina and other bases which consists in lixiviating a melt of the above substances with a solution of substances of acid nature.

6. The process of producing base-exchanging substances containing silica, alumina and other bases which consists in lixiviating a melt of the above substances with a saline solution of sufficiently low concentration to maintain the mechanical coherence of the said melt.

In testimony whereof, I have signed my name to this specification in the presence of two subscribing witnesses.

ROBERT GANS.

Witnesses:
WOLDEMAR HAUPT,
HENRY HASPER.